United States Patent Office 3,531,523
Patented Sept. 29, 1970

3,531,523
N-(PHENOXYPHENYL)SULFAMIDES
Norman A. Nelson, Charlestown Township, Kalamazoo County, and Gary E. Vanden Berg, Texas Township, Kalamazoo County, Mich., assignors to The Upjohn Company, Kalamazoo, Mich., a corporation of Delaware
No Drawing. Filed July 18, 1967, Ser. No. 654,081
Int. Cl. A01n 9/16; C07c 143/74
U.S. Cl. 260—556
2 Claims

ABSTRACT OF THE DISCLOSURE

Disclosed are lipid-normalizing N-(phenoxyphenyl)sulfamides. These compounds are prepared by reacting a phenoxyaniline with a suitable sulfamoyl halide.

BACKGROUND OF THE INVENTION

It is known that relatively high serum cholesterol and triglyceride levels are injurious to arterial tissue, and that such injuries may be one of the causes of coronary heart disease and atherosclerosis. It has now been found that the serum lipid level in a mammal, and in particular the cholesterol and the triglyceride levels, can be lowered by administering to the mammal an effective amount of a compound of the present invention.

SUMMARY OF THE INVENTION

The compounds of this invention are N-(phenoxyphenyl)sulfamides which can be represented by the formula (I) 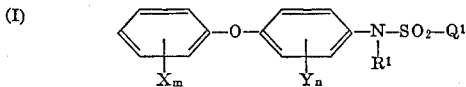

wherein X can be halo, alkyl containing from 1 to 4 carbon atoms, inclusive, or alkoxy containing from 1 to 4 carbon atoms, inclusive; Y can be halo; $R^1$ can be hydrogen, alkyl containing from 1 to 4 carbon atoms, inclusive, 2-piperidinoethyl, 3-piperidinopropyl, 2-(1-pyrrolidinyl)ethyl, 3-(1-pyrrolidinyl)propyl, 2-morpholinoethyl, 3-morpholinopropyl, and dialkylaminoalkyl of the formula

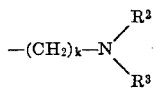

where $R^2$ and $R^3$ can be alike or different and are alkyl containing from 1 to 4 carbon atoms, inclusive; and $Q^1$ can be an amino moiety which is a member of the group consisting of heterocyclic amino moieties such as piperidino, 1-pyrrolidinyl, or morpholino, and amino moieties represented by the formula

where $R^4$ and $R^5$ are alkyl containing from 1 to 4 carbon atoms, inclusive, and are alike or different, and either or both can also be hydrogen when $R^1$ is hydrogen or alkyl. The subscript $k$ can be an integer having a value of 2 or 3, the subscript $m$ is an integer having a value of zero to 3, inclusive, and the subscript $n$ is an integer having a value of zero to 2, inclusive. The foregoing compounds are useful as hypocholesterolemic and hypotriglyceridemic agents.

DETAILED DESCRIPTION OF THE INVENTION

The instant compounds can be prepared by reacting a phenoxyaniline of the type (II) 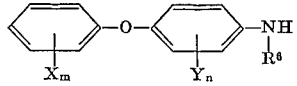

where X, Y, $m$, and $n$ have the same meaning as above and $R^6$ is hydrogen or alkyl containing from 1 to 4 carbon atoms, inclusive, with a sulfamoyl chloride represented by the formula (III)          Cl—SO$_2$—O$^1$ 

where $Q^1$ has the same meaning as above.

In Formulas I and II illustrative halo radicals are fluoro, chloro, bromo, and iodo.

Illustrative of the alkyl radicals contemplated herein are methyl, ethyl, propyl, isporopyl, butyl, isobutyl, sec.-butyl, and tert.-butyl.

Illustrative alkoxy radicals are methoxy, ethoxy, propoxy, isopropoxy, butoxy, isobutoxy, sec-butoxy, and tert.-butoxy.

The phenoxyanilines represented by Formula II are a known group of compounds, some of which are commercially available. Illustrative phenoxyanilines (II) are p-(p-chlorophenoxy)aniline, p-(o-chlorophenoxy)aniline, 3-chloro-4-phenoxyaniline, 4-(p-chlorophenoxy)-3,5-diiodoaniline, p-(2,4-dichlorophenoxy)aniline, p-(2,5-dichlorophenoxy)aniline, p-(2,4-dibromophenoxy)aniline, 3,5-diiodo-4-phenoxyaniline, p-(p-bromophenoxy)aniline, p-(p-iodophenoxy)aniline, p-(o-iodophenoxy)aniline, 3-iodo-4-phenoxyaniline, p-(m-bromophenoxy)aniline, p-(2,4,5-trichlorophenoxy)aniline, p-(2,4,6-trichlorophenoxy)aniline, p-(p-tert.-butylphenoxy)aniline, N-methyl - p - phenoxyaniline, p-(p-tolyloxy)aniline, p-(3,4-xylyloxy)aniline, p-(p - methoxyphenoxy)aniline, p-(m - methoxyphenoxy)aniline, p-(3,5-dimethoxypnenoxy)aniline, p-(6-bromo-2,4-xylyloxy)aniline, 3,5-diiodo - 4 - (p-methoxyphenoxy)aniline, p-(2,6-dimethoxyphenoxy)-N-isopropylaniline, N-sec.-butyl-p-(p - methoxyphenoxy)aniline, p-phenoxyaniline, and the like.

The sulfamoyl chlorides of Formula III also are a known class of compounds, some of which are commercially available. Methods of preparation can be found in J. Am. Chem. Soc. 61, 3250 (1939); Chem. Ber. 92, 509 (1959); Ann. 624, 25 (1959); and Acta Chem. Scand. 17 (7), 2141 (1963).

Illustrative sulfamoyl chlorides (III) are sulfamoyl chloride, methylsulfamoyl chloride, ethylsulfamoyl chloride, propylsulfamoyl chloride, butylsulfamoyl chloride, dimethylsulfamoyl chloride, diethylsulfamoyl chloride, dibutylsulfamoyl chloride, 1-pyrroidinesulfonyl chloride, 1-piperidinesulfonyl chloride, 4-morpholinesulfonyl chloride, dipropylsulfamoyl chloride, and the like.

The reaction between a phenoxyaniline (II) and a sulfamoyl chloride (III) can be carried out by admixing one or more equivalents of the sulfamoyl chloride with the phenoxyaniline in a suitable reaction medium which is also an acid acceptor for the hydrogen chloride formed during the reaction, such as pyridine, the alkyl-substituted pyridines, N,N-dimethylaniline, the tertiary alkylamines such as triethylamine, trimethylamine, etc., with or wthout inert cosolvents typified by methylene chloride, diethyl ether, benzene, tetrahydrofuran, or the like. The reaction temperature can range from about 0° C. to about 60° C. Reaction at about room temperature is preferred, however.

The reaction product from the foregoing reaction is the desired N-(phenoxyphenyl)sulfamide (I) in which $R^1$ is hydrogen or alkyl. This reaction product can be isolated from the reaction mixture in conventional manner, e.g., by filtration or extraction into a water-immscble solvent, followed by washing and drying of the recovered product. If necessary, the product can be purified further by crystallization or by high vacuum distillation.

An N-(phenoxyphenyl)sulfamide (I) where $R^1$ is hydrogen and $Q^1$ is a secondary amino moiety (i.e., has no N-attached hydrogen) can be alkylated by treatment, in an inert organic solvent such as benzene, tetrahydrofuran, or dioxane, with an alkylating agent which can be an alkyl halide or a sec.-aminoalkyl halide. The alkylation takes place in the presence of a base, for example, an alkali metal alkoxide such as potassium tert.-butoxide, or an alkali metal hydride such as sodium hydride or potassium hydride. Reaction temperature for the alkylation reaction can range from about 0° C. to about 100° C. When the alkylating agent is a primary alkyl iodide, room temperature is the preferred reaction temperature; however, for alkyl chlorides a temperature from about 50° C. to about 100° C. is preferred. When sec.-aminoalkyl halides in the form of a hydrohalide salt are employed as the alkylating agent, sufficient base is added to the reaction mixture to liberate the free sec.-aminoalkyl halide and to form the sulfamide alkali metal salt.

Illustrative alkyl halides which can be used as alkylating agents are methyl iodide, ethyl iodide, propyl iodide, butyl iodide, methyl bromide, ethyl chloride, propyl bromide, butyl chloride, sec.-butyl bromide, and the like.

Illustrative sec.-aminoalkyl halides suitable as alkylating agents are N,N-diethyl-2-chloroethylamine, N,N-dibutyl-2-chloroethylamine, N,N-diethyl-3-chloropropylamine hydrochloride, N-methyl-N-propyl-3-bromopropylamine hydrochloride, N-ethyl-N-butyl-2-bromoethylamine, N-(2-chloroethyl)piperidine, N-(3-chloropropyl)piperidine, N-(2-chloroethyl)pyrrolidine, N-(3-chloropropyl)pyrrolidine N-(2-chlorethyl)morpholine, N-(3-chloropropyl)-morpholine, and the like.

The compounds of the present invention where $R^1$ is sec.-aminoalkyl are amines which can exist either in the non-protonated or free-base form, or in the protonated or acid addition salt form, dependnig on the pH of the environment. Stable, pharmaceutically acceptable, protonates can be formed on neutralization of the free-base form with suitable acids such as hydrogen chloride, hydrogen bromide, sulfuric acid, phosphoric acid, acetic acid, and the like.

The compounds of this invention have lipid-normalizing activity and thus are useful as hypocholesterolemic agents and as hypotriglyceridemic agents in mammals.

For purposes of administration, the compounds of this invention can be combined with solid or liquid pharmaceutical carriers and formulated in the form of tablets, powder packets, or capsules, using starch or similar excipients. The instant compounds can also be dissolved or suspended in suitable solvents or vehicles for oral or parenteral administration. If desired, the present active ingredients can also be admixed with food.

The amount of the active ingredient that is to be administered depends on the age, weight, and condition of the recipient, and also on factors such as the frequency and route of administration.

The daily dose range can be from about 0.1 milligram per kilogram of body weight to about 50 milligrams per kilogram of body weight.

The present invention is further illustrated by the following examples.

EXAMPLE 1

Preparation of N,N-dimethyl-N'-(p-phenoxyphenyl-sulfamide

A mixture of p-phenoxyaniline (about 18.5 grams), dimethylsulfamoyl chloride (about 25 milliliters), and pyridine (about 75 milliliters) was stirred at about room temperature for about 3 days. Thereafter water (about 75 milliliters) was added thereto with cooling so as to maintain the mixture at about room temperature. After addition of water the resulting admixture was permitted to stand for about 1 hour and then poured into ice water (about 500 milliliters) containing concentrated hydrochloric acid (about 80 milliliters). The obtained combined mixture was then extracted with methylene chloride, and the obtained extract washed with dilute aqueous hydrochloric acid solution, dilute aqueous sodium bicarbonate solution, and water. Thereafter the extract was dried and concentrated by evaporation.

The produced residue was crystallized from 95 percent ethanol. About 23.5 grams of a crystalline product melting at 144° C. to 146° C. was obtained. A further recrystallization produced a crystalline product melting at 144° C. to 145° C. The crystalline product was identified as N,N-dimethyl-N'-(p-phenoxyphenyl)sulfamide, obtained in about 80 percent yield.

Analysis.—Calc'd for $C_{14}H_{16}N_2O_3S$ (percent): C, 57.51; H, 5.52; N, 9.58. Found (percent): C, 57.54; H, 5.59; N, 9.54.

In a manner similar to Example 1, but using sulfamoyl chloride in lieu of dimethylsulfamoyl chloride as one of the reactants, the corresponding N-(p-phenoxyphenyl) sulfamide can be prepared;

Using methylsulfamoyl chloride the corresponding N-methyl-N'-(p-phenoxyphenyl)sulfamide can be prepared;

Using butylsulfamoyl chloride the corresponding N-butyl-N'-(p-phenoxyphenyl)sulfamide can be prepared;

Using dibutylsulfamoyl chloride the corresponding N,N-dibutyl-N'-(p-phenoxyphenyl)sulfamide can be prepared;

Using 1-pyrrolidinesulfonyl chloride the corresponding N,N - teramethylene-N'-(p-phenoxyphenyl)sulfamide can be prepared;

Using 1-piperidinesulfanyl chloride the corresponding N,N - pentamethylene-N' - (p-phenoxyphenyl)sulfamide can be prepared;

Using 4-morpholinesulfonyl chloride the corresponding N,N - (3-oxapentamethylene)-N'-p-phenoxyphenyl) sulfamide can be prepared; etc.

Similarly, reacting p-(p-chlorophenoxy)aniline with sulfamoyl chloride the corresponding N-(p-chlorophenoxyphenyl)sulfamide is produced;

Reacting 3-chloro - 4 - phenoxyaniline with dibutylsulfamoyl chloride the corresponding N,N-dibutyl-N'-(3-chloro-4-phenoxyphenyl)sulfamide is produced;

Reacting 1-piperidinesulfonyl chloride with 3,5-diiodo-4-(p-methoxyphenoxy)aniline the corresponding N,N'-pentamethylene - N' - [3,5-diiodo - 4 - (p - methoxyphenoxy)phenyl]sulfamide is produced;

Reacting 4-morpholinesulfonyl chloride with p-(2,6-dimethoxyphenoxy)-N-isopropylaniline the corresponding N,N-(3-oxapentamethylene) - N' - isopropyl-N'-[4-(2,6-dimethoxyphenoxy)phenyl]sulfamide is produced, etc.

EXAMPLE II

Preparation of N,N-dimethyl-N'-methyl-N'-(p-phenoxyphenyl)sulfamide

N,N-dimethyl-N'-(p-phenoxyphenyl)sulfamide (about 29.2 grams, 0.1 mole) is dissolved in tetrahydrofuran (about 300 milliliters). To the resulting solution is added, successively, potassium tert.-butoxide (about 11.2 grams, 0.1 mole) and methyl iodide (about 30 milliliters).

After the addition is complete, the obtained admixture is stirred for about 6 hours at about room temperature, and thereafter the admixture is concentrated by evaporation in vacuo. The produced residue is then partitioned between diethyl ether and a dilute aqueous potassium hydroxide solution. The obtained ethereal extract is washed with water and dried. Thereafter the diethyl ether is removed by evaporation. The produced residue is N,N-dimethyl-N'-methyl - N' - (p - phenoxyphenyl)sulfamide which can be further purified by crystallization, if desired.

In a manner similar to Example II but using ethyl iodide, the corresponding N,N-dimethyl-N'-ethyl-N'-(p-phenoxyphenyl)sulfamide can be prepared;

Using propyl iodide the corresponding N,N-dimethyl-N'-propyl-N'-(p-phenoxyphenyl)sulfamide can be prepared;

Using butyl iodide the corresponding N,N-dimethyl-N'-butyl-N'-(p-phenoxyphenyl)sulfamide can be prepared, etc.

EXAMPLE III

Preparation of N,N-dimethyl-N'-[2-(diethylamino)-ethyl]-N'-(p-phenoxyphenyl)sulfamide N,N-dimethyl-N'-(p-phenoxyphenyl)sulfamide (about 29.2 grams, 0.1 mole), benzene (about 300 milliliters), N,N - diethyl-2-chloroethylamine hydrochloride (about 17.2 grams, 0.1 mole, and potassium tert.-butoxide (about 22.4 grams, 0.2 mole) are combined and stirred under reflux for about 30 hours. Thereafter the obtained admixture is cooled, diluted with diethyl ether, washed successively with dilute aqueous sodium hydroxide solution and water, and then dried over magnesium sulfate. The dried solution is then concentrated by evaporation. The produced residue is N,N-dimethyl-N'-[2-(diethylamino) ethyl]-N'-(p-phenoxyphenyl)sulfamide which can be further purified by crystallization, if desired.

Similar to the procedure set forth above, but using N,N-dibutyl-2-chloroethylamine hydrochloride in lieu of N,N-diethyl-2-chloroethylamine hydrochloride, the corresponding N,N - dimethyl-N'-[2-(dibutylamino)ethyl]-N'-(p-phenoxyphenyl)sulfamide can be produced;

Using N,N-diethyl-3-chloropropylamine hydrochloride the corresponding N,N-dimethyl-N'-[3-(diethylamino) propyl]-N'-(p-phenoxyphenyl)sulfamide can be produced;

Using N-methyl-N-propyl-3-chloropropylamine hydrochloride the corresponding N,N - dimethyl-N'-[3-(N-methyl-N-propylamino)propyl] - N' - (p-phenoxyphenyl) sulfamide can be produced;

Using N-(2-chloroethyl)piperidine the corresponding N,N-dimethyl - N' - (2 - piperidinoethyl)-N'-(p-phenoxyphenyl)sulfamide can be produced;

Using N-(3-chloropropyl)morpholine the corresponding N,N-dimethyl - N' - (3 - morpholinopropyl)-N'-(p-phenoxyphenyl)sulfamide can be produced, etc.

We claim:

1. An N-(phenoxyphenyl)sulfamide represented by the formula

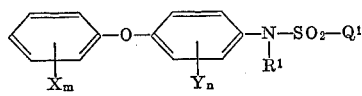

wherein X is a member of the group consisting of halo, alkyl containing from 1 to 4 carbon atoms, inclusive, and alkoxy containing from 1 to 4 carbon atoms, inclusive; Y is halo; $R^1$ is a member of the group consisting of hydrogen, alkyl containing from 1 to 4 carbon atoms, inclusive, and secondary-aminoalkyl selected from the group consisting of 2-piperidinoethyl, 3-piperiodinopropyl, 2-(1-pyrrolidinyl)ethyl, 3-(1-pyrrolidinyl)propyl, 2-morpholinoethyl, 3-morpholinopropyl, and dialkylaminoalkyl of the formula

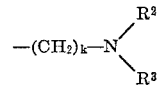

where $R^2$ and $R^3$ can be alike or different and are alkyl containing from 1 to 4 carbon atoms, inclusive; $Q^1$ is an amino moiety which is a member of the group consisting of heterocyclic amino moieties selected from the group consisting of piperidino, 1-pyrrolidinyl, and morpholino, and amino moieties represented by the formula

where $R^4$ and $R^5$ can be alike or different and are hydrogen or alkyl containing from 1 to 4 carbon atoms, inclusive, with the proviso that when $R^1$ is secondary-aminoalkyl, $Q^1$ is a secondary amino moiety; $m$ is an integer having a value of zero to 3, inclusive; $n$ is an integer having a value of zero to 2, inclusive; and $k$ is an integer having a value from 2 to 3, inclsuive; and the corresponding pharmaceutically acceptable acid addition salts.

2. The N-(phenoxyphenyl)sulfamide in accordance with claim 1 wherein $R^1$ is hydrogen, $Q^1$ is an amino moiety represented by the formula

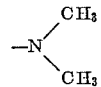

and $m$ and $n$ have a value of zero.

References Cited

UNITED STATES PATENTS 3,143,549   8/1964   Lafferty et al. _____ 260—268

OTHER REFERENCES

Smith: The Chemistry of Open-Chain N-Cpds. I (Benjamin, New York, 1965), p. 73.

HENRY R. JILES, Primary Examiner

C. M. SHURKO, Assistant Examiner

U.S. Cl. X.R.

260—247.1, 293.4, 326.5, 326.82, 543, 571; 424—248, 267, 274, 321

UNITED STATES PATENT OFFICE
CERTIFICATE OF CORRECTION

Patent No. 3,531,523    Dated November 2, 1970

Inventor(s) N.A. Nelson and G. E. VandenBerg

It is certified that error appears in the above-identified patent and that said Letters Patent are hereby corrected as shown below:

Column 2, line 12, for "Cl-$SO_2$-$O^1$" read -- Cl-$SO_2$-$Q^1$ --. Column 2, line 19, for "isporopyl" read -- isopropyl --. Column 2, line 38, for "dimethoxypnenoxy" read -- dimethylphenoxy- Column 2, line 53, for "pyrroidinesulfonyl" read -- pyrrolidinesulfonyl --. Column 2, line 72, for "immscble" read -- immiscible --. Column 3, line 34, for "pyrrolidine N-" read -- pyrrolidine, N- --. Column 3, line 34, for "chlorethyl" read --chloroethyl --. Column 3, line 66, for "phenoxyphenyl-" read -- phenoxyphenyl)- --. Column 4, line 30, for "teramethylene" read -- tetramethylene --. Column 4, line 32, for "piperidinesulfanyl" read -- piperidinesulfonyl --. Column 4, line 36, for "N'-p-" read -- N'-(p- --. Column 4, line 45, for "N,N'-" read -- N,N- --. Column 5, line 14, for "mole," read -- mole), --. Column 6, line 3, for "piperiodinopropyl" read -- piperidinopropyl --.

SIGNED AND
SEALED
DEC 29 1970

(SEAL)
Attest:

Edward M. Fletcher, Jr.
Attesting Officer

WILLIAM E. SCHUYLER, JR.
Commissioner of Patents